United States Patent
Feinberg

(10) Patent No.: US 7,917,390 B2
(45) Date of Patent: Mar. 29, 2011

(54) SYSTEM AND METHOD FOR PROVIDING CUSTOMIZED ADVERTISEMENTS OVER A NETWORK

(75) Inventor: Paul H. Feinberg, River Vale, NJ (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 3010 days.

(21) Appl. No.: 09/785,095

(22) Filed: Feb. 16, 2001

(65) Prior Publication Data

US 2001/0053999 A1 Dec. 20, 2001

Related U.S. Application Data

(60) Provisional application No. 60/210,499, filed on Jun. 9, 2000.

(51) Int. Cl.
*G06Q 30/00* (2006.01)
(52) U.S. Cl. .............. 705/14.63; 705/14.49; 705/14.58; 705/14.55; 705/14.67; 705/26.63
(58) Field of Classification Search ............. 705/14, 705/14.49, 14.58, 14.55, 14.63, 14.67, 26.63
See application file for complete search history.

(56) References Cited

U.S. PATENT DOCUMENTS

| | | | | |
|---|---|---|---|---|
| 5,774,868 A | * | 6/1998 | Cragun et al. | 705/10 |
| 5,918,014 A | | 6/1999 | Robinson | 395/200.49 |
| 5,948,040 A | * | 9/1999 | DeLorme et al. | 701/201 |
| 6,009,410 A | | 12/1999 | LeMole et al. | 705/14 |
| 6,026,369 A | | 2/2000 | Capek | 705/14 |
| 6,026,375 A | * | 2/2000 | Hall et al. | 705/26 |
| 6,112,192 A | | 8/2000 | Capek | 705/59 |
| 6,128,663 A | | 10/2000 | Thomas | 709/228 |
| 6,266,649 B1 | * | 7/2001 | Linden et al. | 705/26 |
| 6,587,835 B1 | * | 7/2003 | Treyz et al. | 705/14 |
| 6,636,733 B1 | * | 10/2003 | Helferich | 455/412.2 |

FOREIGN PATENT DOCUMENTS

WO WO 98/36366 * 8/1998
WO WO 98/47295 * 10/1998

OTHER PUBLICATIONS www.vindigo.com , selected web pages (23 pages, printed Sep. 22, 2000).
Ben Hammer, *GPS To Do Wonders for Wireless Browsing*, cnn.com (dated May 25, 2000; printed Sep. 22, 2000).
www.my.yahoo home page (printed Sep. 22, 2000).

* cited by examiner

*Primary Examiner* — Raquel Alvarez
(74) *Attorney, Agent, or Firm* — Lerner, David, Littenberg, Krumholz & Mentlik, LLP

(57) ABSTRACT

In response to a request for audio-visual content from a user, a method and system is provided which sends the content and additional information related to the location of the user.

48 Claims, 2 Drawing Sheets

SYSTEM AND METHOD FOR PROVIDING CUSTOMIZED ADVERTISEMENTS OVER A NETWORK

CROSS-REFERENCE TO RELATED APPLICATIONS

The present application claims benefit of U.S. Provisional Application No. 60/210,499, filed on Jun. 9, 2000, which is hereby incorporated by reference.

BACKGROUND OF THE INVENTION

As with newspapers, magazines, television and radio, advertisements are also relied upon for financial support to pay for programming delivered via the pages of the World Wide Web. Web page content servers, such as for example Yahoo!, sell space in their web pages to third party advertisers. Advertisements in web pages are presented in many different forms, but most often in the form of an advertising banner displayed across the top or bottom of a web page. A web advertisement typically includes a hyperlink to the home page of the advertiser. Thus, by "double clicking" on an advertising banner, the user quickly jumps to the advertiser's home page, where products or services can be purchased and where more information about a particular product or service can be obtained.

As with traditional communications medium, absent selecting a web site that is more likely to reach a particular segment of the public, advertisements appearing in the pages of the World Wide Web are often targeted to a receiving end user without regard to the user's interest in the subject matter of the advertisement. However, unlike traditional communications medium, the Web offers a much more dynamic way for transmitting advertisements to the public in that different advertisements can be shown to different users who are simultaneously viewing or accessing the same file. Based on this feature, many proposals have been advanced for customizing Web advertisements so as to present different ads to different viewers.

Early efforts to customize Web page advertisements focused on customization preformed by a web site content server after very limited information was obtained about the user of the web site. Advertisements appearing in the home page of Internet search engines and Internet search directories, such as Google and Yahoo!, for example, alter advertisements that appear in advertising banners at the top of their web pages based on the search terms a user enters into the search engine or search directory. For example, after a user enters the search term "loans", the web page might display an advertisement from a loan provider in the advertising banner.

Prior efforts have also customized web advertisements by tracking a user's activity on the Internet, for example, through "cookies"—i.e., small pieces of information sent by a web server to the web browser which can later be read back from the web browser. Based on the user's activity on the Internet, a profile of the user is established, i.e., what types of web sites the user has selected. Other efforts have customized web page advertisements using demographic information previously obtained from the user. For example, demographic information obtained from the user's local browser, which was supplied by the user when setting up service, can be acquired and used to customize advertisements. The demographic information may have been supplied by the user, for example, to the Internet access provider.

SUMMARY OF THE INVENTION

One aspect of the invention relates to a method of providing information to a client device. The method includes: automatically receiving a request for information from the client device; receiving location information indicative of the geographical position of the client device; selecting audio-visual content based on the request and regardless of the location information; selecting geographically oriented information based on the location information; and sending response information to the client device, the response information including the geographically-oriented information and the content.

Another aspect of the invention provides a portable system for presenting information to a user. The system includes a processor, a positioning system, input means for receiving information from a user, a display, a modem, and instructions executable by the processor. The instructions include: receiving a request for information from a user via the input means; retrieving the geographic location of the positioning system from the positioning system; sending the request and the geographic location to a server via the modem; receiving from the server requested information and location information, the requested information being responsive to the request and the location information being responsive to the geographic location; and displaying the requested information and the location information.

In yet another aspect of the invention, a system for presenting information to a user comprises a remote device including a positioning system and a modem, and a server including neutral content and dependant content, the dependant content comprising geographically-oriented content. When the remote device requests the neutral content via the modem and sends its geographical location as determined by the positioning system, the server sends the neutral content and the dependant content.

DETAILED DESCRIPTION OF THE INVENTION

Figure 1:
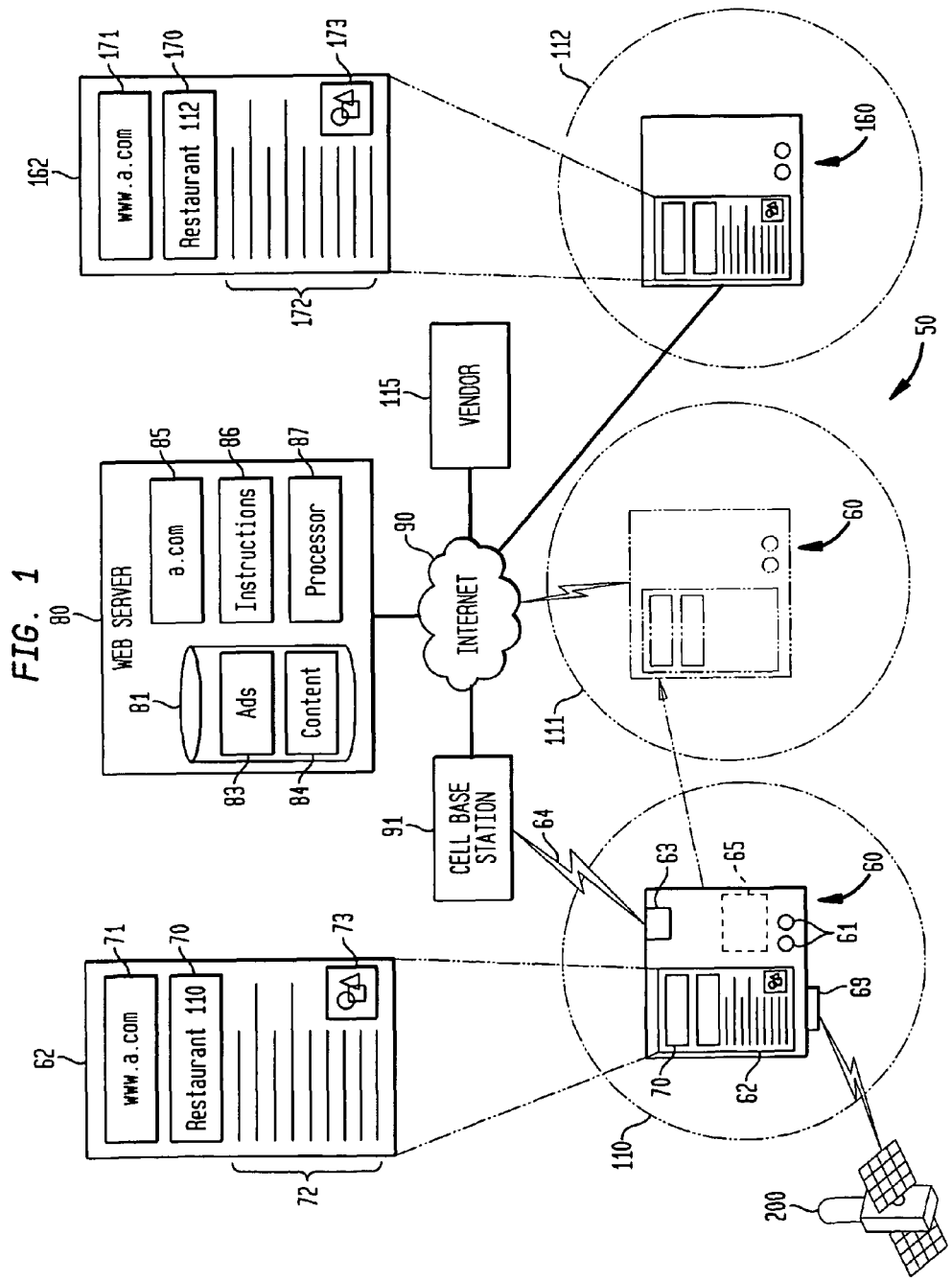
FIG. 1 is a block diagram of a communications network for delivering customized file to users of the network.

As shown in FIG. 1, a system 50 in accordance with one embodiment of the invention comprises a network of computers such as end user personal computer 60 that communicates with web servers 80 via Internet 90. Although only a few computers are depicted in FIG. 1, it should be appreciated that a typical system can include a large number of connected computers.

Preferably, end user computer 60 is a personal digital assistant (PDA) with wireless capability having all the internal components normally found in a PDA such as, for example, central processing unit (CPU) 65, touch-sensitive display 62, buttons 61, wireless modem 63 and all of the components used for connecting these elements to one another. The buttons 61 and display 62 are typically used for data entry, although other data entry means may also be used and present such as keyboards, mice, microphones for voice recognition and the like. Although end user computer 60 is shown as a PDA, it may comprise any work station capable of processing instructions and transmitting data to and from humans and other computers, including network computers lacking local storage capability and Internet-capable wireless phones.

End user computer 60 communicates with the Internet 90 via wireless modem 63 as schematically shown by wireless connection 64. As is known to those of ordinary skill in the art, the connection may be made via a cellular base station 91.

End user computer 60 also includes a GPS receiver 69. The GPS receiver triangulates signals from satellites 200 to determine the latitude and longitude of the GPS receiver 69. GPS receivers for PDA's are widely available. Computer 60 contains software which continuously writes the latitude and longitude in a "cookie" which is accessible to web sites interested in viewing the information contained in the cookie.

Web server 80 contains hardware for sending and receiving information over the World Wide Web, such as web pages or files. The web server 80 may be a typical web server or any computer network server or other automated system capable of communicating with other computers over a network, including the Internet, wide area networks or local area networks.

Web server 80 contains a processor 87, a set of instructions 86 which are executed by processor 87, and a variety of data. Preferably, the instructions 86 are stored as a program on the hard drive of the server. The functions, methods and routines of the program are explained in more detail below. The data includes the data contained in database 81 and, although the data is shown separately from instructions 86, the data may be modified by the program. Although only a single processor is shown, the instructions may actually be distributed to a number of different components or processors for execution.

The server and data 81 are further associated with a particular URL, such as URL 85. For the purposes of example only, the URL shall be considered to be "www.a.com."

Web server 80 provides web pages containing content such as a collection of audio-visual data containing text and pictures of an electronic magazine 84. For all purposes herein, "audio-visual" means information which is either audible, visual or both. The web pages also contain advertisements from Ad-Lookup Table 83. The advertisements differ in as much as they are geographically-oriented, i.e., they are more relevant to one geographical area than another. For example, one advertisement may be about a restaurant located in the northern section of a city whereas another advertisement may be about a restaurant located in the southern section of a city.

Figure 2:
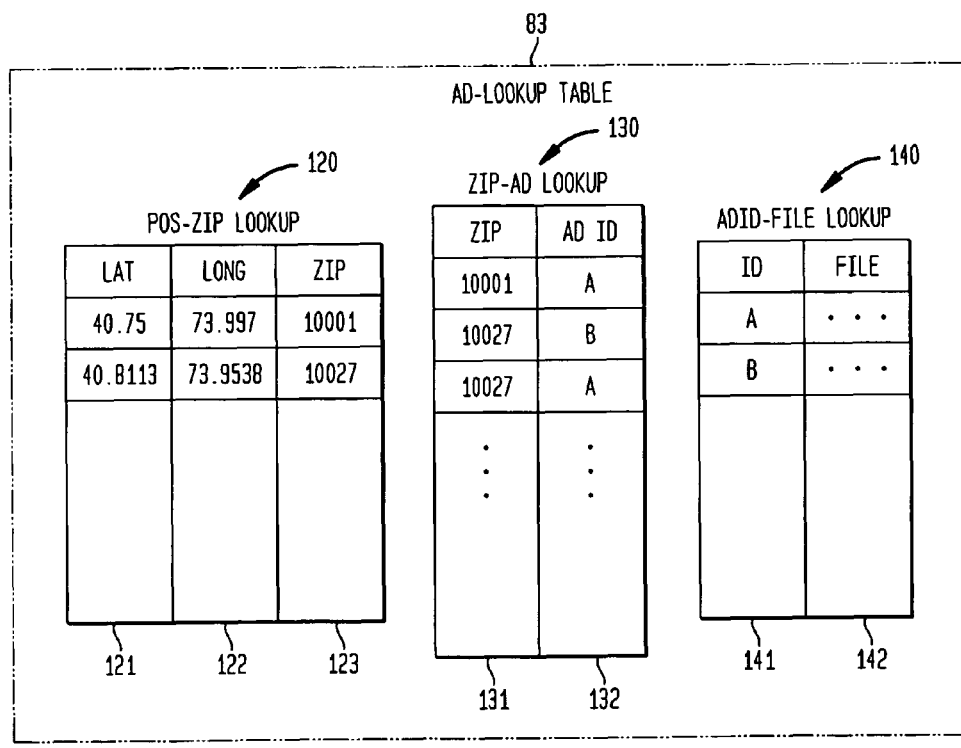
FIG. 2 is a diagram of an Ad Lookup Table.

Ad-Lookup Table 83 is shown in more detail in FIG. 2. Ad-Lookup Table 83 is actually a collection of data comprised of a number of lookup tables, including Pos-Zip Lookup Table 120, Zip-Ad Lookup Table 130 and AdID-File Lookup Table 140. Each record of the Pos-Zip Lookup Table 120 contains three fields, latitude 121, longitude 122 and zip code 123. The Pos-Zip Lookup Table 120 is used to determine the zip code corresponding with a particular latitude and longitude. FIG. 2 shows two example records for two zip codes in New York City. Each record of the Zip-Ad Lookup Table 130 contains a zip code field 131 and an Ad ID field 132. The Zip-Ad Lookup Table 130 is used to determine the ID of an ad or ads that correlate with a particular zip code. As shown by the example illustrated in the figure, each particular zip code may be associated with more than one ad. Each record of the AdID-File Lookup Table 140 contains an ID field 141 and file field 142. The AdID-File Lookup Table 140 is used to find the file containing the particular information about an ad, such as for example its text, pictures and hyperlinks (if any).

In operation, the user will cause the web browser of the PDA to download a page from a particular URL. More specifically and by way of example in FIG. 1, the user enters the URL 85 of web server 80 into the web browser of the PDA, namely "www.a.com". The processor 65 then causes wireless modem 63 to connect with cell base station 91 and, via Internet 90, to web server 80.

Upon receipt of the request for the web page, web server 80 queries the cookie contained in end user computer 60 and extracts the location information (in this instance, the latitude and longitude) stored by GPS receiver 69. For the purposes of illustration, it shall be assumed that reference circle 110 relates to a particular geographical location within New York City while reference circles 111 and 112 relate to other geographical locations in New York City.

Upon receipt of the latitude and longitude, processor 87 in accordance with instructions 86 queries the Ad-Lookup Table 83 to determine which advertisement should be presented to the user. Specifically and with regard to FIG. 2, the processor queries Pos-Zip Lookup Table 120 for the zip code associated with the particular latitude and longitude. Using the sample values shown in the figure, if the latitude and longitude were 40.75 and 73.997, then the processor would select zip code 10001. Once the zip code is obtained, the processor next queries Zip-Ad Lookup Table 130 for the Ad ID or ID's associated with the particular zip code. Using the sample values shown in the figure, if the zip code were 10001, then the Ad ID would be "A". Once the Ad ID is obtained, the processor queries AdID-File Lookup Table 140 to get the information about the advertisement associated with that particular ID. For example, the ad may be the name of a restaurant (such as "Restaurant 110") and function as hyperlink to the home page of the restaurant.

Returning to FIG. 1, once the advertisement information is obtained, the advertisement is combined with the rest of the content 84 contained on the web page. In other words, the web server 80 combines information which is particular to the user's location with information which is not particular to the user's location, and sends the resultant web page to the end user computer 60 via Internet 90. Thus, display 62 will show a web page showing the URL 71 of the web server 80, a banner advertisement which is geographically related to the geographic location of the end user computer 60, and other content (from content file 84) which was requested by the user (such as text 72 and a picture 73) but not necessarily geographically-oriented.

A different end user computer in another geographical location would get the same content as the end user computer 60, but would get different geographically-oriented information. In other words, the steps described above are the same for end user computer 160 but a portion of the display would change. For example, if end user computer 160 is in a different geographical location 112 at latitude 40.8113 and longitude 73.9538, then using the sample values contained in FIG. 2, the end user computer 160 may get an advertisement having the ID of "B", which may be a hyper linked advertisement to a restaurant known as "Restaurant 112." Thus, if both computer 60 and computer 160 downloaded the web page at www.a.com, the displays 62 and 162 would be substantially identical with respect to information which is not dependent on location. The URL's 71 and 171, text 72 and 172 and pictures 73 and 173 would all be identical. The advertisements 70 and 170, on the other hand, would differ.

Similarly, if end user computer 60 moved to a different geographic location 111, the advertisement would change but the rest of the web page would not. If the advertisement portion of the page is automatically refreshed, the advertisement will change automatically. Otherwise, it will change when the page is reloaded.

Accordingly, one of the advantages of the present invention is that in response to requests for information from users, the server provides not only the requested information but other information which is relevant to the current location of the user.

The invention has the added advantage of being able to implement numerous variations and handling different contingencies. The foregoing embodiments are merely illustrative of one manner in which the invention may be implemented. For example, if the geographic location of the computer 60 is unknown, or if there is no advertisement particularly directed to a known location, then a default advertisement or other information targeting a broader geographic region may be selected and transmitted.

At the opposite end of the spectrum are situations where more than one advertisement is associated with any particular geographical area. In this instance, software decision algorithms may be used by the content server to determine which advertisements or information are selected and transmitted to different users of a file.

The advertisement may also cycle through the various advertisements targeted for that area. For example, an advertisement from one vendor can be followed by advertisements from another vendor or additional vendors, based on the geographic location of the user. As shown in the sample values of FIG. 2, there are two advertisements for the 10027 zip code. Similarly, an advertisement for the same vendor may change as the user gets closer to the vendor's establishment. For example, the advertisement may contain messages such as "Your getting closer!".

It is also not necessary to actually store the advertisements at the web server 80. Rather, the advertisements may be stored and provided by another server dedicated to the provision of advertisements.

The process may also include the step of allowing the user to chat with the vendor directly, for example, to negotiate or discuss the availability of items or current sales and special offers. Suitable chat features include systems and methods known for engaging in real time communications over the Internet. Thus, depending on the user's interest, the solicitation may be followed by an electronic coupon and live personalized service, all before the potential customer enters the store.

Indeed, web server 80 may notify the vendor 115 associated with the particular advertisement 70 that a potential customer is in the area. The vendor may then contact the user, either by email or the aforementioned chat, and engage the user in a one-on-one solicitation. Accordingly, the invention is able to provide great advantages over the typical advertising methods.

Still further embodiments of the invention will select an advertisement based not only on the geographic information as described above, but also based on other information as well. For example, in one embodiment, the decision algorithm also determines the time at which a user is requesting a file (such as when the file request is received by the file content server), and accordingly, the advertisement can be customized based on the time of day. Thus, for example, if the user is walking into a mall, and if the time of day is determined to between about 11:00 A.M. and 1:00 P.M., then a banner advertisement on the user's PDA may be updated to display an advertisement for the particular restaurant in the mall and/or may display "lunch specials" or provide coupons for lunch.

Other demographic information may also be used to select or modify the advertisement. For example, the system may use demographic information previously provided by the user to the content server. Accordingly, if information is known about the user's preferences, sale items could be displayed with particular features corresponding to the user's preferences. For example, the displayed page may indicate the preferred shirt color and size of the user in the banner advertisement. Some of the information may already reside in the aforementioned cookie.

Other processes may also be incorporated into the decision algorithm. For example, a vendor's inventory may be simultaneously accessed during the advertisement selection process. Accordingly, after checking the inventory, a vendor can advertise that a store located near the user has a certain items available at this time.

Moreover, the invention is not limited to the Internet, but rather may be implemented over any network. In networks other than the Internet, other languages besides HTML can be used such as XML.

In addition, the invention is not limited to using GPS signals. Any positioning system may be used, such as triangulation of signals from multiple cellular base stations. The positioning system may also use only the unique sector identifier transmitted by the cellular base station 91 to which it is connected. While the sector served by a particular cell base station may be broad, it still provides the opportunity to modify a web page based on the geographical location of the user.

Thus, the user computer 60 has a positioning system which can provide information indicative of its position—be it latitude and longitude, zip codes, cell base station identifiers, area codes and exchanges, radio broadcasts, the identity of local radio stations and the like—and the web server 80 is able to use that information to provide geographically-oriented information along with other information. The invention allows a magazine to come alive based on the location of the user. Whereas prior geographically-oriented advertisements pushed information, the invention allows the subscriber to be pulled towards a merchant in a proactive way.

Although the content described above focused on text and pictures, the content may also include sounds. Indeed, the content may comprise any audio-visual information.

The invention is particularly advantageous for use with next generation cellular telephone technology (such as wideband CDMA [W-CDMA] or Orthogonal Frequency Division Multiplexing [OFDM]) which is geared for high wireless data throughput and pinpointing geographic location in response to emergency 911 calls. It may also be advantageously used in connection with satellite digital radio, such as Satellite Digital Audio Radio Service (SDARS), which is also likely to include data transmission. Unless stated to the contrary, use of the words such as "including," "containing," "comprising" and the like, means "including without limitation" and shall not be construed to limit any general statement that it follows to the specific or similar items or matters immediately following it. Except where the context indicates to the contrary, all company and product names, as well as URL addresses, are intended to be fictitious and used herein for purposes of example only.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

What is claimed is:

1. A method of providing information to a device, said method comprising:
   receiving a request for information from said device;
   receiving location information indicative of the geographical position of said device;
   processing the requested information and location information with at least one processor so as: (1) to select audio-visual content based on said request and regardless of said location information, and (2) to select geographically-oriented information, based on said location information; and sending response information to said client device in response to said request, said response information comprising both said geographically-oriented information and said content, wherein the geographically-oriented information includes (a) a first message of a vendor and (b) a subsequent message of the vendor indicating a change in proximity of the device.

2. The method of claim 1 wherein said location information is provided by said at least one processor.

3. The method of claim 2 wherein said request for information is the address of a web page and said response information is a web page.

4. The method of claim 3 wherein said geographically-oriented information is placed within said web page.

5. The method of claim 4 wherein said web page comprises an on-line magazine.

6. The method of claim 3 wherein said geographically-oriented information relates to an advertisement.

7. The method of claim 1 wherein said advertisement information comprises a hyperlink to another web page.

8. The method of claim 2 wherein said geographically-oriented information is selected based on the time of day of the request.

9. The method of claim 2 wherein said geographically-oriented information is selected based on demographic information relating to the processor or the user of said processor.

10. The method of claim 9 wherein said demographic information was received before said request was received.

11. The method of claim 2 further comprising transmitting default information in place of said geographically-oriented information if said location information is not received.

12. The method of claim 1 wherein said steps of sending and receiving comprise sending and receiving via a wireless connection.

13. The method of claim 1 wherein said location information comprises latitude and longitude.

14. The method of claim 1 wherein said location information is provided by a GPS receiver connected to said processor.

15. A method of providing information to a device, said method comprising:
   receiving a request for information from said device;
   receiving location information indicative of the geographical position of said device;
   processing the requested information and location information with at least one processor so as: (1) to select audio-visual content based on said request and regardless of said location information, and (2) to select geographically-oriented information, based on said location information; and
   sending response information to said client device in response to said request, said response information comprising both said geographically-oriented information and said content,
   wherein said step of selecting geographically-oriented information comprises selecting said geographically-oriented information from a collection of said geographically-oriented information,
   wherein the collection of said geographically-oriented information includes a second message of a vendor and a first message of the vendor, and wherein the step of selecting the geographically-oriented information includes delivering the first message to indicate a change in proximity of the device relative to the vendor.

16. The method of claim 15 wherein at least two items in the collection are associated with the same geographic location.

17. The method of claim 1 further comprising receiving a request for information from a second processor different from the other said processor; receiving location information indicative of the geographical position of said second processor; selecting audio-visual content based on said request and regardless of said location information, said request from said second processor being identical to the request from said other processor; selecting geographically-oriented information for said second client that is different from the geographically-oriented information for said other processor.

18. The method of claim 1 wherein said geographically-oriented information is chosen from a plurality of information associated with said geographical position.

19. The method of claim 18 wherein said plurality of information associated with said geographical position comprises a plurality of advertisements associated with a plurality of different entities near said geographical position.

20. The method of claim 1 wherein said geographically-oriented information comprises an advertisement for a vendor and said advertisement changes based on the distance between said geographical position and said vendor's establishment.

21. The method of claim 1 wherein said audio-visual content and said geographically-oriented information are stored on different servers.

22. A method of providing information to a device, said method comprising:
   receiving a request for information from said device;
   receiving location information indicative of the geographical position of said device;
   processing the requested information and location information with at least one processor so as: (1) to select audio-visual content based on said request and regardless of said location information, and (2) to select geographically-oriented information, based on said location information; and
   sending response information to said client device in response to said request, said response information comprising both said geographically-oriented information and said content,
   wherein said geographically-oriented information is associated with an entity, and further comprising the step of said entity being notified that said geographically-oriented information has been sent to said client, and
   wherein the geographically-oriented information communicates a change in proximity between the device and the entity with a plurality of messages concerning the entity.

23. The method of claim 22 wherein said entity sends a communication to said processor after said step of said entity being notified.

24. The method of claim 23 further comprising the step of said entity and said processor chatting with one another.

25. The method of claim 22 further comprising the step of the entity associated with said geographically-oriented information sending an electronic coupon to said processor.

26. The method of claim 1 wherein said geographically-oriented information includes information relating to the inventory of an entity.

27. The method of claim 1 wherein said location information comprises latitude and longitude.

28. The method of claim 1 wherein said location information comprises a zip code.

29. The method of claim 1 wherein said location information comprises a cell base station identifier.

30. The method of claim 1 wherein said location information comprises an area code.

31. The method of claim 1 wherein said location information the identity of local radio station.

32. A portable system for presenting information to a user comprising:
- a processor;
- a positioning system;
- input means for receiving information from a user;
- a display;
- a modem;
- instructions executable by said processor, said instructions comprising receiving a request for information from a user via said input means; retrieving the geographic location of said positioning system from said positioning system; sending said request and said geographic location to a server via said modem; receiving from said server requested information and location information, said requested information being responsive to said request and said location information being responsive to said geographic location; and displaying said requested information and said location information with a plurality of messages of a vendor to indicate a change in location of the portable device with respect to the vendor.

33. The system of claim 32 wherein said portable system is a personal digital assistant (PDA) and said modem is a wireless modem.

34. The system of claim 33 wherein said wireless modem communicates with a cellular base station.

35. The system of claim 33 wherein said display and said input means comprises a touch-sensitive display.

36. The system of claim 32 wherein said portable system comprises an Internet-capable wireless phone.

37. The system of claim 32 wherein said positioning system comprises a GPS receiver.

38. The system of claim 32 wherein said positioning system determines location based on a signal from a cellular base station.

39. The system of claim 32 wherein said positioning system determines location by triangulating signals from cellular base stations.

40. The system of claim 39 wherein said positioning system determines location based a unique sector identifier transmitted by a cellular base station.

41. A system for presenting information to a user comprising:
- a remote device comprising a positioning system and a modem;
- a server comprising neutral content and dependant content, said dependant content comprising geographically-oriented content;
- wherein when said remote device requests said neutral content via said modem and sends its geographical location as determined by said positioning system, said server sends said neutral content and said dependant content, said dependant content at least including first and second messages concerning a vendor to indicate a change in proximity of the remote device with respect to the vendor.

42. The system of claim 41 wherein said server is a web server and communicates with said remote device via the Internet.

43. The system of claim 41 wherein said neutral content and dependant content is sent in HTML format.

44. The system of claim 41 wherein said neutral content and dependant content is sent in XML format.

45. The system of claim 41 wherein said server is associated with a URL.

46. The system of claim 45 wherein said remote device requests said neutral. content by requesting said content form said URL.

47. The system of claim 46 wherein said neutral content comprises a web page containing audio or visual data.

48. The system of claim 47 wherein said web page comprises an on-line magazine.

* * * * *

UNITED STATES PATENT AND TRADEMARK OFFICE
CERTIFICATE OF CORRECTION

| | | |
|---|---|---|
| PATENT NO. | : 7,917,390 B2 | |
| APPLICATION NO. | : 09/785095 | |
| DATED | : March 29, 2011 | |
| INVENTOR(S) | : Paul H. Feinberg | |

It is certified that error appears in the above-identified patent and that said Letters Patent is hereby corrected as shown below:

Title Page, item (57), second line of Abstract, "system is provided" should read -- system are provided --;

Title Page, item (57), second line of Abstract, "which sends the" should read -- which send the --;

Column 2, line 38, "customized file" should read -- customized files --;

Column 3, line 4, "PDA's" should read -- PDAs --;

Column 4, line 15, "ID's" should read -- IDs --;

Column 4, line 46, "hyper linked" should read -- hyper-linked --;

Column 4, line 51, "URL's" should read -- URLs --;

Column 4, line 66, "handling" should read -- handle --;

Column 5, line 23, "Your" should read -- You're --;

Column 6, line 5, delete the second instance of "a";

Column 9, line 6, "the identity" should read -- comprises the identity --;

Column 9, line 6, "of local" should read -- of a local --;

Column 9, line 33, "comprises" should read -- comprise --;

Column 10, line 5, "based a" should read -- based on a --;

Column 10, line 26, "content is sent" should read -- content are sent --;

Column 10, line 28, "content is sent" should read -- content are sent --;

Column 10, line 32, "content form" should read -- content from --.

Signed and Sealed this
Twenty-seventh Day of March, 2012

David J. Kappos
*Director of the United States Patent and Trademark Office*